3,535,295
PRESSURE SENSITIVE ADHESIVE COMPOSITIONS COMPRISING HIGHER ALKYL AMINES

Irwin J. Davis, Plainfield, and Julius Sirota, South Plainfield, N.J., assignors to National Starch and Chemical Corporation, New York, N.Y., a corporation of Delaware
No Drawing. Filed Jan. 6, 1969, Ser. No. 789,393
Int. Cl. C08f 45/44; C09j 3/14, 7/02
U.S. Cl. 260—80.8                                10 Claims

ABSTRACT OF THE DISCLOSURE

Improved pressure sensitive adhesive compositions based on acrylate ester copolymers, and the labels, decals, tapes, etc. coated with said compositions. Said improved compositions are prepared by the addition thereto of higher alkyl amines.

---

This invention relates to new, improved pressure sensitive adhesive compositions. More particularly, it relates to pressure sensitive adhesive compositions comprising acrylic-based random copolymers having carboxyl groups therein to which higher alkyl amines are added in specified amounts. The compositions are useful in connection with the manufacture of removable pressure sensitive vinyl labels, decals, tapes, and the like.

In another aspect, this invention relates to the preparation and use of such adhesive compositions.

As is known in the art, pressure sensitive adhesives comprise a class of adhesive compositions which may be formulated from a variety of materials such as gums and resins of both natural and synthetic derivation. When coated on a suitable solid backing, these adhesive compositions share the common characteristic of being aggressively and permanently tacky at room temperature and are thus able to adhere to surfaces by the application of nothing more than manual pressure. Adhesives of this type may be applied to various backings such as paper, cloth, and plastic films, and the resulting coated backings may then be converted into tapes and labels which are especially useful in the packaging field for any number of applications involving marking, sealing, reinforcing, and bonding.

In order to be satisfactory in commercial usage, a pressure sensitive adhesive must, of course, possess good tack and tack retention properties; that is, the adhesive must firmly adhere to various substrates, as for example, glass, metal, painted surfaces, and the like. Generally, it is to be noted that the formulation of pressure sensitive adhesive compositions is based on the particular end-use or commercial application of the resulting pressure sensitive adhesive.

It is an object of this invention to prepare new, improved pressure sensitive adhesive compositions which display excellent properties of tack and tack retention, adhesive strength and stability, for use with pressure sensitive labels, decals, tapes, and the like, and which also possess the desirable characteristic of being readily removable from the substrate to which they have been adhered. Another object of this invention is the use of said adhesive compositions to prepare pressure sensitive vinyl labels, decals, tapes, and the like, without the application of a so-called "anchor coat" to the vinyl film backing prior to the application of the adhesive layer. Other objects and advantages of this invention will be apparent from the following description.

Vinyl, e.g. polyvinyl chloride or vinyl chloride copolymer, films used as backings for labels, decals, tapes, etc., which are intended for use in the preparation of permanent, tamperproof products often utilize pressure sensitive adhesive compositions based on random copolymers of acrylate esters. For example, U.S. Pat. No. 3,371,071, which issued on Feb. 27, 1968 to B. A. Brooks and B. D. Jubilee, Jr., describes the preparation of adhesive compositions based on random copolymers of octyl acrylate, ethyl acrylate, vinyl acetate, and maleic anhydride prepared by means of free radical initiated polymerization procedures.

It is well-known in the art that pressure sensitive adhesives based on acrylate ester copolymers produce strong bonds with vinyl film backings and with various other solid substrates such as glass, metal, paper, etc.; the latter property thereby making these adhesives particularly suitable for use in preparing products designed for permanent application to a substrate. Furthermore, the use of acrylic-based adhesives with vinyl film backings offers advantages of economy and convenience in that such adhesives are capable of being directly applied to vinyl film backings by transfer from release sheets without the prior application of a so-called "anchor coat" to the vinyl film. An anchor coat is often needed with vinyl film backings where pressure sensitive adhesives which are not based on acrylate ester copolymers are used in order to effectively bond the latter adhesives to the vinyl film backing. As pointed out above, however, prior to the time of our invention, acrylic-based adhesives could only be used for the preparation of adhesive products which were intended for permanent application to a substrate.

We have now found that acrylic-based copolymers which contain carboxyl groups therein and to which specified concentrations of a higher alkyl amine, or mixtures of such amines, have been added in accordance with this invention, permit the use of such acrylic-based adhesives for the preparation of labels, decals, tapes, etc. which are readily removable from the substrate to which they have been applied. Where it was previously thought that acrylic-based pressure sensitive adhesives used with vinyl film backings could only be used to prepare products designed for permanent application to a substrate, it is now possible to utilize these adhesives in preparing products which may be easily removed from the substrate to which they have been applied. It is believed that the amine reacts with the carboxyl groups of the acrylate ester based adhesive copolymer and is thereby prevented from migrating into the vinyl film backing. The amine is thus "fixed" in the adhesive composition.

For the purposes of this disclosure, when reference is hereinafter made to "carboxylated acrylate ester copolymers," or to similar terms, it is meant to denote a copolymer containing from about 0.5 to 10% of acidic comonomers as based on the total weight of the copolymer, said copolymer containing at least one polymerizable comonomer selected from the group consisting of the alkyl esters of acrylic and methacrylic acid containing a maximum of about 12 carbon atoms in the esters group and optionally, one or more polymerizable copolymers selected from the group consisting of vinyl esters, vinyl ethers, vinyl halides, vinylidene halides, nitriles of ethylenically unsaturated monocarboxylic acids, and anhydrides of ethylenically unsaturated dicarboxylic acids, such that the resulting copolymer has a Williams plasticity value ranging from about 1.50 to 5.50.

Plasticity may be defined as the property of a polymeric material which enables it to be deformed permanently and continuously, without rupture, upon the application of a force thereto. This property is measured by the use of a William's Plastometer which is manufactured by Scott Testers, Inc. and is designed to conform to the standards set by ASTM Method D-926.

In determining Williams plasticity values, a film, having a dry thickness of 2–3 mils, of the copolymer being evaluated, is cast onto a conventional release sheet. The dry film is peeled from the release sheet and molded into a solid cylindrical slug approximately 9/16 inch wide, 2 centimeters long, and weighing exactly 1.8 grams. The slug is then conditioned for 15 minutes at a temperature of 100° F. whereupon it is inserted between the two parallel platens of the plastometer which have also been maintained at a temperature of 100° F. The upper platen which is weighted with 5 kilograms and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow and, thus, denote a firmer polymer whereas low plasticity values are indicative of less resistance to flow, and, thus, denote a softer polymer.

With regard to the carboxyl containing acrylic-based random copolymers which may be used in the adhesive compositions of this invention, these may include copolymers of one or more acrylate ester monomers selected from the group consisting of the alkyl esters of acrylic and methacrylic acid wherein said alkyl groups contain a maximum of about 12 carbon atoms. Such esters include methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, and dodecyl acrylate, as well as the corresponding methacrylate esters.

Copolymerized with the above listed acrylate and methacrylate esters, optionally, may be one or more vinyl comonomers selected from the group consisting of vinyl esters, such as vinyl acetate; vinyl ethers, such as vinyl ethyl ether; vinyl halides, such as vinyl chloride; vinylidene halides, such as vinylidene chloride; nitriles of ethylenically unsaturated monocarboxylic acids, such as acrylonitrile; and anhydrides of ethylenically unsaturated dicarboxylic acids, such as maleic anhydride.

In addition, the copolymers, as used in our invention, must contain moieties derived from at least one acidic comonomer such, for example, as acrylic acid, methacrylic acid, crotonic acid, itaconic acid, and the $C_1$–$C_4$ alkyl half acids of maleic and fumaric esters such, for example, as methyl hydrogen maleate and butyl hydrogen fumarate, as well as any other acidic monomers which will be uniformly copolymerized with the comonomer(s) desired by the practitioner.

It is to be understood that as long as the selected copolymer contains from about 0.5 to 10%, by weight, of one of the above listed acidic comonomers and has a Williams plasticity value ranging from about 1.50 to 5.50, such a copolymer will be satisfactory for use in preparing our novel adhesive products, irrespective of the particular concentration therein of the required alkyl acrylate or methacrylate ester comonomer and the optional vinyl comonomer.

As will be recognized by those skilled in the art, the preparation of the above-described random copolymers can be carried out using well-known free radical initiated polymerization procedures. Since our novel adhesives will ordinarily be utilized in the form of an organic solvent solution, i.e. as a lacquer, the copolymers may be directly prepared in the form of such lacquers by heating a mixture containing the desired proportions of the selected monomers, including the acidic comonomer, together with the appropriate organic solvent, e.g. methylene chloride, ethyl acetate, ethyl formate, methyl ethyl ketone, heptane, cyclohexane, toluene, and the like, or mixtures thereof, in the presence of a free radical initiator such as azobisisobutyronitrile or benzoyl peroxide. The heating of the latter monomer solution proceeds for a period of about 1 to 2 hours, at the reflux temperature of the system, whereupon additional solvent is ordinarily added so that the copolymer resin solids content of the resulting lacquer may be maintained within the desired range of about 25 to 45%, by weight. Polymerization is then completed by heating the reaction mixture for an additional 5 to 8 hours at its reflux temperature. If desired, polymerization procedures may be varied by utilizing modifications as described in the pertinent literature.

Ordinarily, the copolymers are prepared for use in the adhesives of this invention by dilution with one or more appropriate solvents so as to have a resin solids content in the range of from about 20 to 50%, by weight. Suitable diluents include all of the above-mentioned solvents which may be used in the preparation of the copolymers, although the use of toluene is preferable. The minimum intrinsic viscosity of the diluted copolymers, as determined in acetone at 25° C., should be not less than about 0.6.

With regard to the higher alkyl amines which are to be used according to this invention and are to be added to the above-described carboxyl containing acrylic-based copolymers, these are primary amines and may include, for example, myristyl, cetyl and stearyl amine. At least about 14 carbon atoms are required in the alkyl moiety of the amine if it is to be suitable for use in the novel adhesives of this invention. Commercial tallow amines, such as primary hydrogenated tallow amine, may also be used in the novel adhesives of this invention. Commercial tallow amines are based on mixtures comprising long-chain acids substantially in the proportions as follows:

| | Percent |
|---|---|
| Myristic acid | 2.0 |
| Palmitic acid | 32.5 |
| Stearic acid | 14.5 |
| Oleic acid | 48.3 |
| Linoleic acid | 2.7 |

We have found that, generally, secondary higher alkyl amines are not as effective as the corresponding primary amines in our compositions. Thus, although such secondary higher alkyl amines are not completely ineffectual, we prefer to use the above-described primary higher alkyl amines in the compositions of this invention. In the practice of this invention, the above-described applicable amines, or mixtures thereof, are admixed with the carboxylated acrylic-based copolymers in concentrations of from about 1 to about 10%, by weight, as based on the weight of copolymer solids. The copolymer solids content of our adhesive compositions, when ready for use, is generally adjusted to a level of from about 20 to about 45%, by weight, by the addition of one or more appropriate solvents.

If desired, conventional additives may be incorporated into the novel adhesives of our invention in order to modify the properties thereof. Among these additives may be included: plasticizers, such as dioctyl phthalate, or resins such as hydrogenated methyl esters of rosin and diethylene glycol esters of rosin; fillers or pigments, such as talc and clay; and anti-oxidants, such as hindered phenols.

In using the lacquers containing the novel adhesives of our invention for the preparation of removable labels, decals, tapes, and the like, they may be applied by means of any coating technique whose use is desired by the practitioner. Thus, these modified copolymer lacquers may be sprayed onto a selected film backing or they may be applied by use of any mechanical coating process such as air knife, trailing blade, knife coater, reverse roll, or gravure coating techniques. In addition, the adhesive lacquer may be applied by transfer of the adhesive from a release sheet onto the selected backing. The adhesive lacquers are applied at coating weights which yield a dry film thickness in the range of about 0.5 to 3.0 mils. The coating weights at which these adhesives are applied will, of course, vary according to the particular copolymer used, the selected backing, and the specific contemplated end-product.

While the adhesive compositions of this invention are particularly suitable for use with vinyl film backings the use of these adhesive compositions with other types of backings is also within the scope of this invention. Examples of other backings include the films derived from synthetic resins such as polyethylene, polypropylene, polyvinyl chloride and polyvinylidene chloride, polyethylene terephthalate, polystyrene, and rubber hydrochloride, as well as backings derived from paper, paperboard, cloth, fiber glass, foamed plastics, cellophane, metal foils and the like.

After a suitable period of time to allow for transfer from a release sheet, the resultant adhesive-coated products are ready for use and exhibit excellent pressure sensitive adhesive properties which are unaffected by aging. Moreover, in all cases, these products will be found to be readily removable from the solid substrates to which they have been adhered.

This invention is further illustrated in connection with the following examples. In these examples, all parts given are by weight unless otherwise noted.

EXAMPLE I

This example illustrates the preparation of an adhesive composition typical of this invention.

A reaction vessel fitted with a thermometer, stirrer and condenser was charged with 50 parts of 2-ethylhexyl acrylate, 50 parts of vinyl acetate, 2 parts of acrylic acid, 40 parts of methylene chloride, 35 parts of ethyl acetate, and 0.06 part of azobisisobutyronitrile. The mixture was heated, while under agitation, until reflux was attained. Heating was continued at the reflux temperature for two hours, whereupon 23 parts of toluene and an additional 0.14 part of azobisisobutyronitrile were added. The polymerization mixture was then further refluxed for an additional period of 6 hours. At this point polymerization was complete and the reaction mixture was cooled to about 22° C.

The resulting copolymer lacquer was clear with a slight yellow cast. The Williams plasticity value was 2.20. The total amount of copolymer resin solids was 50%. This lacquer was then diluted with toluene so as to yield a solution containing 40%, by weight, of resin solids. The intrinsic viscosity, as measured in acetone at 25° C. was 1.0. To the cooled copolymer lacquer was admixed 6 parts of primary hydrogenated tallow amine and the resulting mixture was gently stirred for one-half hour. The thus-produced adhesive composition was applied by the transfer method to plasticized polyvinyl chloride film from release sheets. On being tested, samples using this composition exhibited excellent adhesive properties and moreover, were readily removed from the substrate to which they had been adhered.

EXAMPLE II

This example illustrates the preparation of additional samples of adhesives typical of this invention.

The polymerization procedure described in Example I, hereinabove, was repeated with a number of variations being made with respect to the monomers utilized as well as in their comonomer ratios. The following table describes all of the copolymers thus produced.

TABLE I

| | Formulation (Parts) | | | | | | | | |
|---|---|---|---|---|---|---|---|---|---|
| | A | B | C | D | E | F | G | H | I |
| Vinyl acetate | 28 | 53 | 25 | 25 | 50 | 46 | | | 55 |
| Vinyl chloride | | | | 25 | | | | | |
| Acrylonitrile | | | 25 | | | | 40 | | |
| Butylacrylate | | | | | 10 | | | | |
| 2-ethylhexyl acrylate | 70 | 45 | 50 | 50 | 40 | | | 30 | |
| Hexyl methacrylate | | | | | | 46 | 54 | 60 | |
| Lauryl acrylate | | | | | | | | | 40 |
| Acrylic acid | 2 | 2 | 2 | 1 | 9 | | | | |
| Methacrylic acid | | | | | | 4 | 1 | 10 | 5 |
| Stearyl amine (dry basis) | 6 | 4 | 1 | 10 | 3 | 10 | 2 | 2 | 3 |

In all cases the resulting copolymer lacquers were found to be clear with a slight yellow cast, while the films of these copolymers had a Williams plasticity value in the range of 1.80 to 3.5. The resulting lacquers were diluted with toluene so as to adjust their resin content to a value of about 40%, by weight, whereupon stearyl amine, in concentrations as indicated above, was added to each sample. The resulting compositions were each applied from release sheets to plasticized polyvinyl chloride film by the transfer method. Each sample exhibited excellent adhesive properties and was found to be readily removable from the substrate to which it had been adhered.

EXAMPLE III

This example illustrates the improved properties imparted to the novel adhesive copolymer compositions of this invention as a result of the presence therein of a higher alkyl primary amine which in this case was a hydrogenated tallow amine.

The polymerization recipes and polymerization procedures used in this example were identical to those set forth in Example I, hereinabove, with the exceptions, however, that the concentration of hydrogenated tallow amine was varied as indicated in the following table and the copolymer component of Formulations Nos. 7 through 12 did not contain any acrylic acid.

TABLE II

| Formulation Number | Parts By weight | | |
|---|---|---|---|
| | Copolymer | Toluene | Amine |
| 1 | 62.0 | 25 | 0.0 |
| 2 | 62.0 | 25 | 0.5 |
| 3 | 62.0 | 25 | 1.0 |
| 4 | 62.0 | 25 | 1.5 |
| 5 | 62.0 | 25 | 2.0 |
| 6 | 62.0 | 25 | 2.5 |
| 7 | 62.0 | 25 | 0.0 |
| 8 | 62.0 | 25 | 0.5 |
| 9 | 62.0 | 25 | 1.0 |
| 10 | 62.0 | 25 | 1.5 |
| 11 | 62.0 | 25 | 2.0 |
| 12 | 62.0 | 25 | 2.5 |

The above-described formulations, each of which had a resin solids content of 40%, by weight, were cast on a silicone coated release paper in a thickness sufficient to produce an adhesive film having a dry thickness of 1.0 mil. The latter film was dried in an oven set at 250° F., and then transferred to a flexible plasticized polyvinyl chloride film having a thickness of 4.0 mils. After an aging period of several days, 1″ by 6″ strips from each of the thus transferred films were applied to stainless steel panels. After 4 hours at room temperature, initial peel adhesion tests were run. The latter test consists of measuring the force necessary to strip or delaminate the adhesive film test sample, at a 180° angle, from a stainless steel panel at a rate of pull, or withdrawal, of 12 inches per minute. An Instron Tensile Tester was used to provide the pulling force. Thus, the force necessary to effect delamination is recorded as the "180° Peel Adhesion" value. Additional samples of each formulation, as previously described, were placed in an oven set at 140° F. without removing the release sheet backing. After a one week aging period, the latter backing was removed from the polyvinyl chloride film and the above described adhesion tests were again repeated on the oven-aged samples. Table III, hereinbelow, summarizes the data thereby obtained.

TABLE III

| Formulation Number | 180° Peel adhesion value (ounces per in.) | |
|---|---|---|
| | Initial | After 1 week at 140° F. |
| 1 | 32.0 | 38.4 |
| 2 | 11.2 | 6.4 |
| 3 | 11.2 | 4.8 |
| 4 | 11.2 | 3.2 |
| 5 | 11.2 | 1.6 |
| 6 | 11.2 | 1.6 |
| 7 | 51.2 | 44.8 |
| 8 | 19.2 | 40.0 |
| 9 | 17.6 | 32.0 |
| 10 | 6.2 | 24.0 |
| 11 | 6.2 | 16.0 |
| 12 | 4.8 | 16.0 |

The above data reveals that the addition of the amine substantially reduced initial adhesion in the adhesive compositions based upon both the carboxylated and the non-carboxylated copolymer. In the aged samples, however, adhesive build-up was noted in the non-carboxylated copolymer samples while a desirable reduction in adhesion was still shown with the carboxylated copolymer samples.

EXAMPLE IV

This example illustrates the effects of aging on the panels or substrates of samples prepared with varying amounts of hydrogenated tallow amine.

The polymerization recipes and polymerization procedures used in this example were identical to those set forth in Formulation Nos. 1 through 6 of Example III, hereinabove. Initial 180° Peel Adhesion Values, as well as Peel Adhesion Values after aging the samples on the stainless steel panels in an oven at 140° F. for 72 hours, were run as described in Example III. Table IV, hereinbelow, summarizes the data obtained.

TABLE IV

| Formulation Number | 180° Peel adhesion value (ounces per inch) | |
|---|---|---|
| | Initial | After 72 hours on steel panel |
| 1 | 32.0 | 75.2 |
| 2 | 11.2 | 36.8 |
| 3 | 11.2 | 24.0 |
| 4 | 11.2 | 16.0 |
| 5 | 11.2 | 14.0 |
| 6 | 11.2 | 12.5 |

The above data reveals that aging under the severe conditions of 140° F. for 72 hours resulted in substantial adhesive build-up in Formulation No. 1 which did not contain any amine, while the addition of increasing concentrations of amine was found to proportionately inhibit such adhesive build-up. It can be understood that excessive adhesive build-up in products such as removable labels, decals, tapes, and the like, is not a desirable property as its occurrence would hinder the removal of the decal and possibly damage the substrate.

EXAMPLE V

This example illustrates the effect produced in the properties of our novel adhesive compositions when they are prepared using a variety of amines.

The polymerization recipes and polymerization procedures used in this example were identical to those set forth in Example I, hereinabove, with the exception that the particular amine which was utilized was varied as indicated in Table V, hereinbelow.

TABLE V

| Formulation Number | Parts by weight | | |
|---|---|---|---|
| | Copolymer | Toluene | Amine |
| 1 | 62.0 | 25 | 0.0. |
| 2 | 62.0 | 25 | 1.0, primary hydrogenated tallow amine. |
| 3 | 62.0 | 25 | 1.0, primary stearyl amine. |
| 4 | 62.0 | 25 | 1.0, secondary dihydrogenated tallow amine. |
| 5 | 62.0 | 25 | 1.0, primary oleyl amine. |
| 6 | 62.0 | 25 | 1.0, primary lauryl amine. |
| 7 | 62.0 | 25 | 1.0, primary 2-ethylhexyl amine. |
| 8 | 62.0 | 25 | 1.0, primary butyl amine. |

The above described compositions each of which had a resin solids content of 40%, by weight, were applied to plasticized polyvinyl chloride film by transfer and initial 180° peel adhesion values, as well as peel adhesion values after aging on release paper in an oven set at 140° F. for one week, were run as described in Example III, hereinabove. Table VI, hereinbelow, summarizes the data thus obtained.

TABLE VI

| Formulation Number | 180° Peel adhesion value (ounces per inch) | |
|---|---|---|
| | Initial | After 1 week at 140° F. |
| 1 | 32.0 | 38.4 |
| 2 | 11.2 | 6.4 |
| 3 | 16.0 | 19.2 |
| 4 | 27.2 | 4.0 |
| 5 | 25.6 | 16.0 |
| 6 | 28.0 | 12.8 |
| 7 | 32.0 | 8.0 |
| 8 | 44.8 | 4.8 |

The above data demonstrates that the compositions containing the primary hydrogenated tallow amine and the primary stearyl amine produce a desirable reduction in the initial peel adhesion value without revealing any adhesive build-up on aging as compared to the control values of Formulation No. 1 in which no amine was present. The composition containing oleyl amine was found to behave satisfactorily. The remaining compositions, containing the amines which do not have the required number of carbon atoms, did not demonstrate any adhesive build-up on aging, but their initial peel adhesion values were not significantly lowered and, in one instance, it was increased.

Summarizing, it is seen that the addition of primary higher alkyl amines to carboxylated acrylate ester copolymer lacquers according to the process of our invention, results in pressure sensitive adhesive compositions particularly suited for the manufacture of removable pressure sensitive vinyl labels, decals, tapes, and the like.

Variations may be made in proportions, procedures, and materials without departing from the scope of this invention defined by the following claims.

We claim:

1. A pressure sensitive adhesive composition comprising an organic solvent solution of:
   (A) a carboxylated acrylate ester copolymer containing (1) from about 0.5 to 10% of a carboxylated monomer, as based on the weight of said copolymer and (2) at least one comonomer polymerizable with said carboxylated monomer selected from the group consisting of the alkyl esters of acrylic and methacrylic acids containing a maximum of about 12 carbon atoms in the alkyl group of said esters; said copolymer having a Williams plasticity value of from about 1.50 to 5.50; said copolymer being admixed in said solution with
   (B) from about 1 to 10% of a primary alkyl amine containing at least about 14 carbon atoms in the alkyl group thereof, as based on the weight of said copolymer.

2. The pressure sensitive adhesive composition of claim 1, wherein said copolymer contains at least one polymerizable comonomer selected from the group consisting of vinyl esters, vinyl ethers, vinyl halides, vinylidene halides, nitriles of ethylenically unsaturated monocarboxylic acids, and anhydrides of ethylenically unsaturated dicarboxylic acids.

3. The pressure sensitive adhesive composition of claim 1, wherein the carboxylated monomer is selected from the group consisting of acrylic acid, methacrylic acid, crotonic acid, itaconic acid, and the $C_1-C_4$ alkyl half esters of maleic and fumaric acids.

4. The pressure sensitive adhesive composition of claim 1, wherein said primary higher alkyl amine is selected from the group consisting of oleyl, stearyl, and hydrogenated tallow amine.

5. A solid backing coated with a pressure sensitive adhesive film comprising the dried, consolidated residue of an organic solvent solution of:
(A) a copolymer containing (1) from about 0.5 to 10% of a carboxylated monomer, as based on the weight of said copolymer and, (2) at least one comonomer polymerizable with said carboxylated monomer selected from the group consisting of the alkyl esters of acrylic and methacrylic acids containing a maximum of about 12 carbon atoms in the alkyl groups of said esters; said copolymer having a Williams plasticity value of from about 1.50 to 5.50; said copolymer being admixed in said solution with
(B) from about 1 to 10% of a primary alkyl amine containing at least about 14 carbon atoms in the alkyl group thereof, as based on the weight of said copolymer.

6. The solid backing of claim 5, wherein said copolymer contains at least one polymerizable comonomer selected from the group consisting of vinyl esters, vinyl ethers, vinyl halides, vinylidene halides, nitriles of ethylenically unsaturated monocarboxylic acids, and anhydrides of ethylenically unsaturated dicarboxylic acids.

7. The solid backing of claim 5, wherein the carboxylated monomer is selected from the group consisting of acrylic acid, methacrylic acid, crotonic acid, itaonic acid, and the $C_1-C_4$ alkyl half esters of maleic and fumaric acids.

8. The solid backing of claim 5, wherein said primary higher alkyl amine is selected from the group consisting of oleyl, stearyl, and hydrogenated tallow amine.

9. A pressure sensitive adhesive composition comprising an organic solvent solution of a carboxylated acrylate ester copolymer containing 2 parts of acrylic acid, 50 parts of 2-ethylhexyl acrylate, and 50 parts of vinyl acetate; the latter proportions being based on the total weight of the copolymer; said copolymer being admixed in said solution with 6 parts of primary hydrogenated tallow amine.

10. A polyvinyl chloride backing coated with a pressure sensitive adhesive film comprising the dried, consolidated residue of an organic solvent solution of a carboxylated acrylate ester copolymer containing 2 parts of acrylic acid, 50 parts of 2-ethylhexyl acrylate, and 50 parts of vinyl acetate; the latter proportions being based on the total weight of the copolymer; said copolymer being admixed in said solution with 6 parts of primary hydrogenated tallow amine.

References Cited

UNITED STATES PATENTS

| 3,222,419 | 12/1965 | Jubilee et al. | 260—836 |
| 3,371,071 | 2/1968 | Brooks et al. | 260—78.5 |
| 3,400,094 | 9/1968 | Testa | 260—32.6 |
| 3,462,284 | 8/1969 | Vertnik | 117—122 |

DONALD E. CZAJA, Primary Examiner

R. W. GRIFFIN, Assistant Examiner

U.S. Cl. X.R.

117—122, 132, 138.8, 161; 156—327; 260—31.2, 32.6, 33.6, 33.8, 78.5, 80.76 86.1